(12) United States Patent
Ratnarajah (10) Patent No.: US 6,980,600 B1
(45) Date of Patent: Dec. 27, 2005

(54) RECEIVER SYSTEM FOR MULTIPLE-TRANSMIT, MULTIPLE-RECEIVE (MTMR) WIRELESS COMMUNICATIONS SYSTEMS

(75) Inventor: Tharmalingam Ratnarajah, Kanata (CA)

(73) Assignee: Nortel Networks Limited, St. Laurent (CA)

( * ) Notice: Subject to any disclaimer, the term of this patent is extended or adjusted under 35 U.S.C. 154(b) by 494 days.

(21) Appl. No.: 09/748,329

(22) Filed: Dec. 26, 2000

(51) Int. Cl.[7] ............................. H04L 27/28; H04B 7/02
(52) U.S. Cl. ........................ 375/260; 375/267; 455/500
(58) Field of Search ................................ 375/144, 148, 375/260, 267, 347, 349; 455/500

(56) References Cited

U.S. PATENT DOCUMENTS

| | | | |
|---|---|---|---|
| 5,414,734 A * | 5/1995 | Marchetto et al. | 375/267 |
| 6,069,912 A * | 5/2000 | Sawahashi et al. | 375/142 |
| 6,473,467 B1 * | 10/2002 | Wallace et al. | 375/267 |
| 6,496,534 B1 * | 12/2002 | Shimizu et al. | 375/148 |
| 6,636,568 B2 * | 10/2003 | Kadous | 375/225 |

* cited by examiner

Primary Examiner—Young T. Tse
(74) Attorney, Agent, or Firm—Mintz, Levin, Cohn, Ferris, Glovsky and Popeo P.C.

(57) ABSTRACT

A wireless communication system is provided which transmits and receives Multiple-Transmit Multiple-Receive (MTMR) signal in which the superimposed substreams of the received MTMR signal are recovered by concurrently estimating all of the substreams of the transmitted signal. A plurality of estimated data symbols are defined as a function of the plurality of signal samples. A difference expression that represents a difference between a function of a plurality of estimated data symbols and a function of the plurality of signal samples is determined and is a sum of plurality of terms. Values for each of a portion of a plurality of estimated data symbols are repeatedly selected such that one of the plurality of terms is minimized. Values for a further portion of the plurality of estimated data symbols are repeatedly selected such that a further one of the plurality of terms is minimized.

31 Claims, 4 Drawing Sheets

FIG. 1

Capacity, ccdfs

RECEIVER SYSTEM FOR MULTIPLE-TRANSMIT, MULTIPLE-RECEIVE (MTMR) WIRELESS COMMUNICATIONS SYSTEMS

BACKGROUND OF THE INVENTION

The present invention is directed to the delivery of data via a wireless connection and, more particularly, to the accurate detection of data received via a wireless connection.

In a wireless communications system, data is delivered from a transmitter to a receiver using radio waves or other electromagnetic waves. The waves, however, may be reflected off objects in the environment and scattered randomly while propagating from the transmitter to the receiver so that multiple images of the transmitted signal may arrive at the receiver via different scattered paths. The scattering, known as multipath scattering, can cause the images to arrive at the receiver at slightly different times and interfere destructively, thereby cancelling each other. Thus, multipath scattering may significantly impede the accurate transmission of data over the wireless connection.

A known approach for achieving high spectral efficiencies is by transmitting the data using a base transceiver station (BTS) having multiple antennas and then receiving the transmitted data using a remote station having multiple receiving antennas. This approach is known as Multiple Transmit-Multiple Receive (MTMR). As an example, a single data stream is divided into multiple substreams, and an array of transmitter antennas is used to concurrently transmit the parallel substreams using the same frequency band. The transmitted substreams are then picked up by an array of receiver antennas. Each of the receiver antennas receives all of the transmitted substreams as a single, superimposed signal, rather than as a plurality of individual signals. A receiver located at the remote stations then demodulates the superimposed substreams to recover the original, transmitted substreams.

The scattered images of the transmitted substreams, however, are also picked up by the array of receiver antennas. Because each of the substreams originates from a different transmitter antenna located at a respectively different point in space, each substream is scattered differently, i.e. independently, and is thus received independently at each receiver antenna. When there is sufficient multipath scattering, the original substreams are not readily recovered.

The scattered images of the transmitted substreams may arrive at the receiver antenna at the same time, i.e. with no delay spread, known as flat fading or may arrive with at different times, i.e. with a delay spread, known as frequency selective fading. In the delay spread or frequency selective fading environment, currently transmitted symbols interfere with previously transmitted symbols, which is called inter-symbol intereference (ISI).

A known signal processing algorithm, referred to as "Bell Laboratories Layered Space-Time" (BLAST), uses differences in the scattering to identify and recover the transmitted substreams. The substreams are first sorted according to the strength of each channel, and the strongest substream is detected and extracted from the total received signal. Then, the substreams are again sorted based on their signal strength, and the next strongest substream is detected and extracted from the total received signal. The sorting and extracting process is repeated until all of the substreams are determined. The BLAST algorithm assumes that only flat fading is present and is therefore not suitable for delay spread environments, such as in a mobile wireless environment.

Thus, in the presence of ISI, the BLAST algorithm is not applicable. Moreover, while detecting the current strongest substream, the BLAST algorithm nulls the remaining substreams. This nulling is often imperfect because of channel estimation errors and, as a result, the performance of the receiver is degraded.

It is therefore desirable to recover the received data streams in the presence of ISI and without degrading receiver performance.

SUMMARY OF THE INVENTION

The present invention provides a wireless communication system for transmitting and receiving a MTMR signal in which the superimposed substreams of the received MTMR signal are recovered by estimating all of the substreams of the transmitted signal concurrently.

In accordance with an aspect of the invention, transmitted data symbols estimated from a plurality of signal samples that are received by a plurality of receivers. The data symbols are part of a data stream that is divided into a plurality of substreams. Each of the receives signal samples includes one or more data symbols from each of the plurality of substreams. The plurality of signal samples are represented as a function of a plurality of transmitted data symbols and a plurality of channel response values. Each of the plurality of channel response values represents a respective signal response for a transmission path of at least one of the transmitted data symbols. At least part of the plurality of channel response values includes channel responses caused by multipath scattering. A plurality of estimated data symbols is defined as a function of the plurality of signal samples. The function satisfies a performance related criterion. A difference expression that represents a difference between a function of a plurality of estimated data symbols and a function of the plurality of signal samples is determined and is a sum of a plurality of terms. Values for each of a portion of a plurality of estimated data symbols are repeatedly selected such that one of the plurality of terms if minimized. Values for a further portion of the plurality of estimated data symbols are repeatedly selected such that a further one of the plurality of terms is minimized, where the further one of the plurality of terms is a function of the further portion of the plurality of estimated data symbols and the selected values of the plurality of estimated data symbols, until each of the terms is minimized.

In accordance with this aspect of invention, the received signal samples each include at least one data symbol from each of the transmitters or may include at least one data symbol from each of a plurality of users.

Other features and advantages of the present invention will become apparent from the following detailed description of the invention with reference to the accompanying drawings.

BRIEF DESCRIPTION OF THE DRAWINGS

The invention will now be described in greater detail in the following detailed description with reference to the drawings in which.

DETAILED DESCRIPTION OF THE INVENTION

The present invention provides a MTMR architecture for detecting data transmitted over a wireless connection in which superimposed substreams of a signal are received and demodulated by concurrently estimating the substreams. The data is transmitted by multiple antennas or by multiple users.

Figure 1:
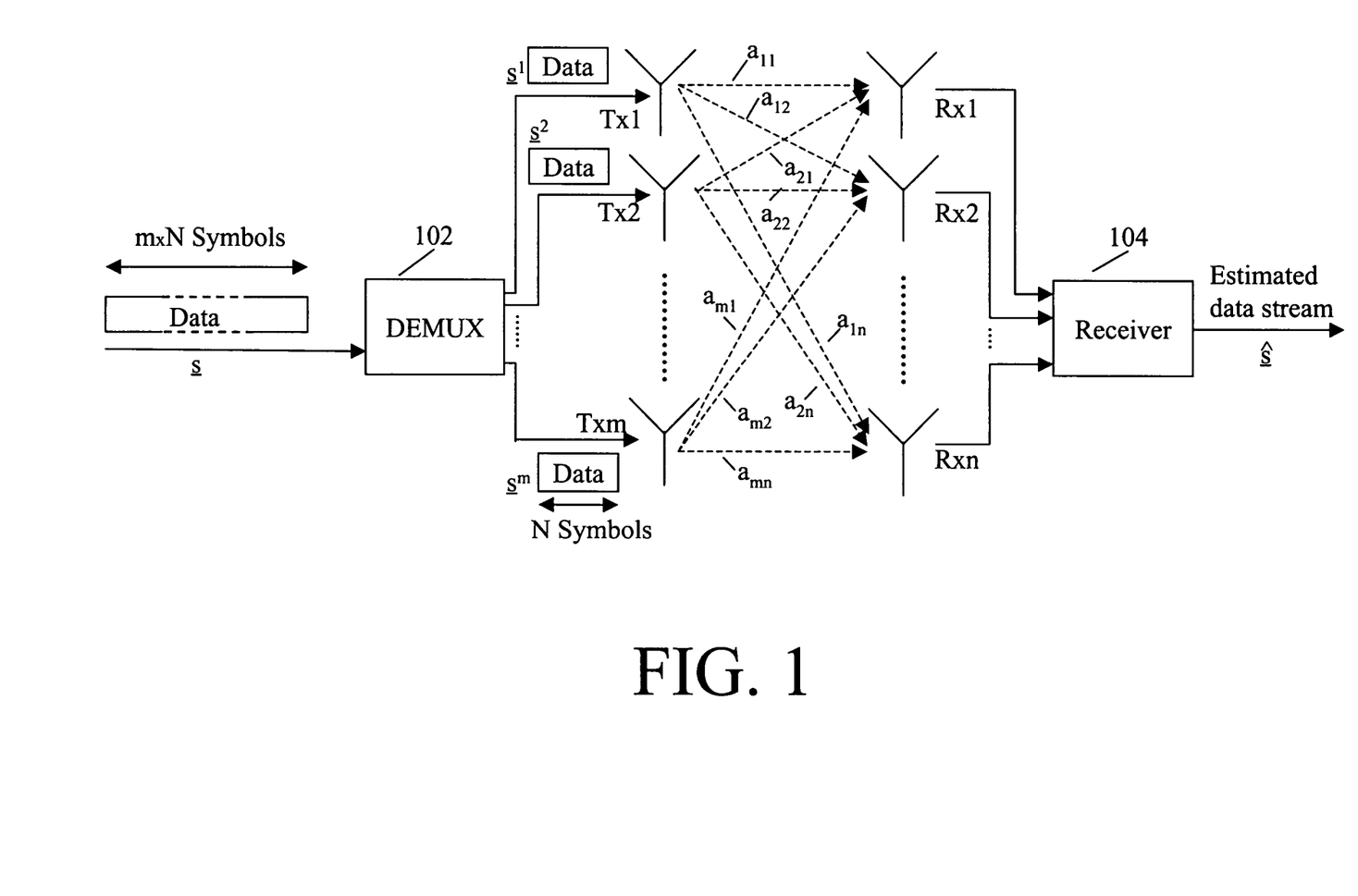
FIG. 1 is a block diagram showing an example of a MTMR wireless communication arrangement in which plural transmitter antennas concurrently transmit respective substreams of symbols to plural receiver antennas.

FIG. 1 shows an arrangement for transmitting, receiving and detecting data according to the invention.

At a transmitter location, a single, encoded data stream comprised of mN symbols is delivered to a demultiplexer (DEMUX) 102 which divides the data stream into data substreams of symbols each. The DEMUX delivers the substreams to transmitters Tx1, Tx2, . . . , Txm, respectively. The transmission power is equally divided among the transmit antennas.

The transmitters Tx1 to Txm transmit the substreams over a common wireless channel, typically at a symbol rate 1/T symbols/sec, with synchronized symbol timing. The transmitters may be quadrature amplitude modulation (QAM) transmitters, phase shift keying (PSK) transmitters, or other known transmitters that may be represented as a vector-valued transmitter where components of each transmitted m-vector are symbols drawn from a QAM constellation.

Alternatively, the data substreams are transmitted by a single transmitter antenna but represent users.

At a receiving location, a plurality of antennas Rx1, Rx2, . . . , Rxn each receive signals transmitted from all of the transmitter antennas or m users and deliver the received signals to a receiver 104 which concurrently demodulates all of the received signals. The n antennas and the receiver 104 are typically comprise a quadrature amplitude modulation (QAM) receiver system, though over modulation methods may be employed.

The capacity C of the transmitters and receivers is defined by the following relation:

$$C = \log_2 det\left[I + \left(\frac{\rho}{m}\right)HH^H\right] \text{ bits/sec/Hz,}$$

where H is an m×n channel matrix, ρ is a spatial average of the signal-to-noise ratio (SNR) at each of the n receiver antenna elements.

Figure 2:
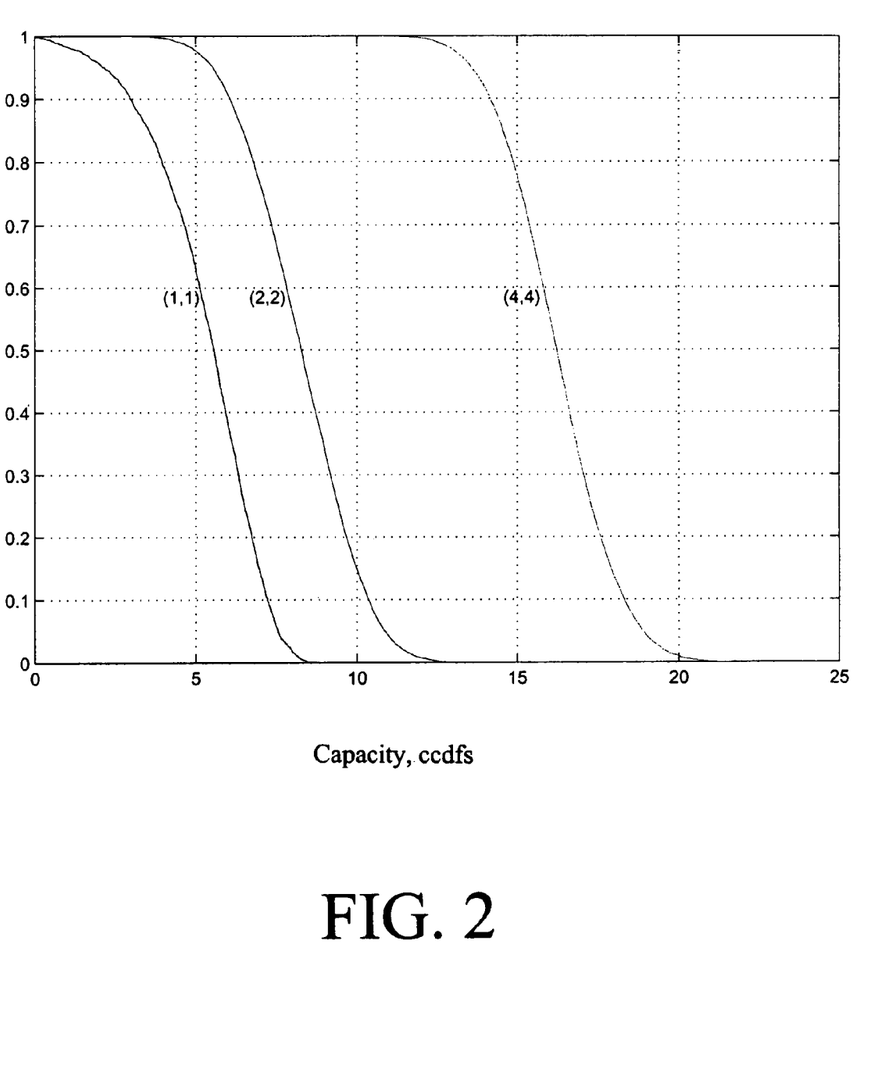
FIG. 2 diagram showing respective complementary cumulative distribution functions of the capacity for a (1,1), (2,2) and (4,4) diversity communication system.

FIG. 2 shows respective complementary cumulative distribution functions (ccdfs) of the capacity C for: (1) a (1,1) diversity communication system, namely a communication system comprised of one transmitter antenna and one receiver antenna, (2) a (2,2) diversity communication system, namely a communication system comprised of two transmitter antennas and two receiver antennas, and (3) a (4,4) diversity communication system, namely a communication system comprised of four transmitter antennas and four receiver antennas. As FIG. 2 shows, the capacity increases linearly with the number of transmitter and receiver antennas.

The detection operation of the receiver 104 is now described:

A signal sample $x_k^j$ is received by an antenna j of the n receiver antennas at a discrete time instant k. The received signal sample $x_k^j$ is represented by a sum of the symbols transmitted by the m antennas according to the following relation:

$$x_k^j = \sum_{i=1}^{m} a_{ij} s_k^i + n_k^j,$$

where $a_{ij}$ are the channel impulse response coefficients of a signal path from the ith transmitter antenna to the jth receiver antenna, $s_k^i$ is the symbol transmitted by the ith transmitter antenna, or from the ith user, that is received at the time instant k, and $n_k^j$ is a value representing additive white Gaussian noise that is received by the jth receiver antenna at the time instant k. The channel impulse response coefficients $a_{ij}$ are estimated from training symbols which are embedded in the transmitted symbol sequence and whose values are already known to the receiver. The receiver compares the expected training symbol values with the values that are actually received and uses a least squared channel estimation to determine the values of the channel impulse response coefficient.

The representation of a single signal sample $x_k^j$ received at the receiver antenna j may be extended to a stacked block data model, which represents N signal samples received at the receiver antenna j, by stacking the N received signals $x_k^j$ into a N×1 vector $\underline{x}^j$ where:

$$\underline{x}^j = [x_1^j, x_2^j, \ldots, x_N^j]^T,$$

in which T a transpose operator. The vector $\underline{x}^j$ may be represented as a function of the transmitted symbols in N×1 complex space by the relation:

$$\underline{x}^j = A^j \underline{s} + \underline{n}^j \epsilon C^{N \times 1},$$

where $A^j$ is a matrix representing the channel response values of the signal paths between the first to mth transmitter antennas or users and the jth receiver antenna, $\underline{s}$ is an vector of the respective N symbols transmitted by each of the m transmitter antennas, and $\underline{n}^j$ is a vector representing additive white Gaussian noise that is received by the jth receiver antenna at the time that each of the N signal samples is received.

In a flat Rayleigh fading environment, in which there is multipath scattering with no delay spread, the matrix $A^j$ is ordinarily a block diagonal matrix that is defined in N×Nm complex space by the relation:

$$A^j = [\text{diag}(a_{1j}), \text{diag}(a_{2j}), \ldots, \text{diag}(a_{mj})] \epsilon C^{N \times Nm},$$

namely $A^j$ is a N row, Nm column matrix that is arranged as follows:

$$A^j = \begin{bmatrix} a_{1j} & 0 & 0 & 0 & \ldots & a_{2j} & 0 & 0 & 0 & \ldots & \ldots & a_{mj} & 0 & 0 & 0 & \ldots \\ 0 & a_{1j} & 0 & 0 & \ldots & 0 & a_{2j} & 0 & 0 & \ldots & \ldots & 0 & a_{mj} & 0 & 0 & \ldots \\ 0 & 0 & a_{1j} & 0 & \ldots & 0 & 0 & a_{2j} & 0 & \ldots & \ldots & 0 & 0 & a_{mj} & 0 & \ldots \\ 0 & 0 & 0 & a_{1j} & \ldots & 0 & 0 & 0 & a_{2j} & \ldots & \ldots & 0 & 0 & 0 & a_{mj} & \ldots \\ \vdots & \vdots & \vdots & \vdots & \ddots & \vdots & \vdots & \vdots & \vdots & \ddots & \ldots & \vdots & \vdots & \vdots & \vdots & \ddots \end{bmatrix}.$$

The invention, however, also accounts for multipath scattering with a delay spread, i.e. accounts for the presence of ISI, and therefore the matrix $A^j$ typically includes values that "band" the block diagonal values. Thus, $A^j$ is a block banded matrix with N+v rows and Nm columns that is arranged as follows:

$$A^j = \begin{bmatrix} a^1_{1j} & 0 & 0 & 0 & \ldots & \ldots & a^1_{2j} & 0 & 0 & 0 & \ldots & \ldots & a^1_{mj} & 0 & 0 & 0 & \ldots \\ a^2_{1j} & a^1_{1j} & 0 & 0 & \ldots & \ldots & a^2_{2j} & a^1_{2j} & 0 & 0 & \ldots & \ldots & a^2_{mj} & a^1_{mj} & 0 & 0 & \ldots \\ a^3_{1j} & a^2_{1j} & a^1_{1j} & 0 & \ldots & \ldots & a^3_{2j} & a^2_{2j} & a^1_{2j} & 0 & \ldots & \ldots & a^3_{mj} & a^2_{mj} & a^1_{mj} & 0 & \ldots \\ a^4_{1j} & a^3_{1j} & a^2_{1j} & a^1_{1j} & \ldots & \ldots & a^4_{2j} & a^3_{2j} & a^2_{2j} & a^1_{2j} & \ldots & \ldots & a^4_{mj} & a^3_{mj} & a^2_{mj} & a^1_{mj} & \ldots \\ \vdots & \vdots & \vdots & \vdots & \ddots & \ldots & \vdots & \vdots & \vdots & \vdots & \ddots & \ldots & \vdots & \vdots & \vdots & \vdots & \ddots \\ a^v_{1j} & \vdots & \vdots & \vdots & \ldots & \ldots & a^v_{2j} & \vdots & \vdots & \vdots & \ldots & \ldots & a^v_{mj} & \vdots & \vdots & \vdots & \ldots \\ 0 & a^v_{1j} & \vdots & \vdots & \ldots & \ldots & 0 & a^v_{2j} & \vdots & \vdots & \ldots & \ldots & 0 & a^v_{mj} & \vdots & \vdots & \ldots \\ 0 & 0 & a^v_{1j} & \vdots & \ldots & \ldots & 0 & 0 & a^v_{2j} & \vdots & \ldots & \ldots & 0 & 0 & a^v_{mj} & \vdots & \ldots \\ \vdots & \vdots & \vdots & \vdots & \ddots & \ldots & \vdots & \vdots & \vdots & \vdots & \ddots & \ldots & \vdots & \vdots & \vdots & \vdots & \ddots \end{bmatrix}$$

The above vector $\underline{s}$ is comprised of the N symbols transmitted by each of the m transmitter antennas and is defined by the relation:

$$\underline{s}[(\underline{s}^1)^T,(\underline{s}^2)^T,\ldots,(\underline{s}^m)^T]^T,$$

in which $\underline{s}^i$ is a vector representing the N symbols transmitted by the ith transmitter antennas. The vector $\underline{s}^i$ is defined by the relation:

$$\underline{s}^i = [s^i_1, s^i_2, \ldots, s^i_N]^T.$$

The vector $\underline{n}^j$ represents the additive white Gaussian noise and is defined by the relation:

$$\underline{n}^j = [n^j_1, n^j_2, \ldots, n^j_N]^T.$$

The signal samples received by each of the n receiver antennas may be then combined into a single vector representation as follows:

$$\underline{x} = \sum_{j=1}^{n} [A^j]^H \underline{x}^j,$$

where the vector A is defined according to the relation $$A = \sum_{j=1}^{n} [A^j]^H [A^j]$$

in which $[A^j]^H$ is the complex conjugate transpose of $[A^j]$. When the above relation for $\underline{x}^j$ is inserted into x, the following relation is obtained:

$$\underline{x} = \sum_{j=1}^{n} [A^j]^H [A^j] \underline{s} + [A^j]^H \underline{n}^j$$

$$= A\underline{s} + \underline{n} \in C^{Nm \times 1},$$

where $\underline{n}$ represents the additive white Gaussian noise, $\underline{n} = \sum_{j=1}^{n} [A^j]^H \underline{n}^j$, with a covariance matrix given by the relation:

$$R_{nn} = \varepsilon\left\{\left(\sum_{j=1}^{n} [A^j]^H \underline{n}^j\right)\left(\sum_{j=1}^{n} [A^j]^H \underline{n}^j\right)^H\right\}$$

$$= \sigma \sum_{j=1}^{n} [A^j]^H [A^j]$$

$$= \sigma^2 A,$$

where $\varepsilon$ is an expectation operator, $\sigma^2$ is the noise variance, and it is assumed that:

$$\varepsilon\{[\underline{n}^j][\underline{n}^i]^H\} = \begin{cases} \sigma^2 I & i = j \\ 0 & i \neq j. \end{cases}$$

Using the above relation for $\underline{x}$, the values within the transmitted data symbols vector $\underline{s}$ are determined using decision-feedback sequence estimation to satisfy a performance related criterion, such as a minimum mean squared error (MMSE) or a zero forcing (ZF) criterion. When MMSE is the performance related criterion, a minimum mean squared error-block linear estimator (MMSE-BLE) is derived from which a minimum mean squared error-block decision feedback sequence estimator (MMSE-BDFSE) is obtained. When ZF is the performance related criterion, a zero forcing-block linear estimator (ZF-BLE) is derived from which a zero forcing-block decision feedback sequence estimator (ZF-BDFSE) is obtained.

To determine the MMSE block level estimator, the values within the matrix of the transmitted data symbols $\underline{s}$ are estimated by minimizing the following quadratic form $Q_{MMSE}$:

$$\min_{\underline{s}} Q_{MMSE}(\underline{s}) = \min_{\underline{s}} \varepsilon\{\|\hat{\underline{s}} - \underline{s}\|^2\}$$

$$= \min_{\underline{s}} \varepsilon\{(\hat{\underline{s}} - \underline{s})^H (\hat{\underline{s}} - \underline{s})\},$$

where $\hat{\underline{s}}$ is an vector of estimated data symbols, $$\|\hat{\underline{s}} - \underline{s}\|^2 = (\hat{\underline{s}} - \underline{s})^H (\hat{\underline{s}} - \underline{s})$$

is the magnitude of the vector $\hat{\underline{s}} - \underline{s}$, and $\hat{\underline{s}}$ is the estimated value of $\underline{s}$. By solving for $\hat{\underline{s}}$, the following relation is obtained:

$$\hat{\underline{s}} = \arg\min_{\underline{s}} Q_{MMSE}(\hat{\underline{s}})$$

$$= (A^H R_{nn}^{-1} A + R_{ss}^{-1})^{-1} A^H R_{nn}^{-1} \underline{x}$$

$$= \left( \sum_{j=1}^{n} [A^j]^H [A^j] + \sigma^2 R_{ss}^{-1} \right)^{-1} \left( \sum_{j=1}^{n} [A^j]^H \underline{x}^j \right),$$

where is it assumed that $\underline{s}$ is distributed according to a Gaussian distribution having a zero mean value and a covariance matrix $R_{ss}$, namely $\underline{s} \sim N(\underline{0}, R_{ss})$, and $\underline{n}$ is distributed according to a Gaussian distribution having a zero mean value and a covariance matrix $R_{nn}$, namely $\underline{n} \sim N(\underline{0}, R_{nn})$, and $R_{ss} = \varepsilon\{\underline{s}\underline{s}^H\} = I$.

To determine the ZF block level estimator, the values within the vector of the transmitted data symbols $\underline{s}$ are estimated by minimizing the following quadratic form $Q_{ZF}$:

$$\min_{\underline{s}} Q_{ZF}(\underline{s}) = \min_{\underline{s}} \{\|\underline{x} - A\underline{s}\|^2_{R_{nn}}\}$$

$$= \min_{\underline{s}} \{(\|\underline{x} - A\underline{s})^H R_{nn}^{-1} (\underline{x} - A\underline{s})\}.$$

The solution for $\hat{\underline{s}}$ is given by the relation:

$$\hat{\underline{s}} = \arg\min_{\underline{s}} Q_{ZF}(\underline{s})$$

$$= (A^H R_{nn}^{-1} A)^{-1} A^H R_{nn}^{-1} \underline{x}$$

$$= \left( \sum_{j=1}^{n} [A^j]^H [A^j] \right)^{-1} \left( \sum_{j=1}^{n} [A^j]^H \underline{x}^j \right),$$

where it is assumed that $\underline{n}$ is distributed according to a Gaussian distribution having a zero mean value and a covariance matrix $R_{nn}$, namely $\underline{n} \sim N(\underline{0}, R_{nn})$.

The proof of the solutions for the MMSE block level estimator and the ZF block level estimator are known, such as is described in "Fundamentals of Statistical Signal Processing—Estimation Theory", Vol. 1, S. M. Kay, Prentice Hall, 1993.

Improved detection performance is obtained using the MMSE block decision feedback sequence estimator and the ZF block decision feedback sequence estimator, instead of the MMSE block level estimator and the ZF block level estimator. The MMSE block decision feedback sequence estimator and the ZF block decision feedback sequence estimator are derived using a Cholesky decomposition of the inverse portions of the above expressions for the MMSE block decision feedback sequence estimator and the ZF block decision feedback sequence estimator. Namely, using the expression for the MMSE block level estimator, the relation $$\left( \sum_{j=1}^{n} [A^j]^H [A^j] + \sigma^2 R_{ss}^{-1} \right) = LL^H$$

is defined and then substituted into the above MMSE expression for $\hat{\underline{s}}$ to obtain the following relation:

$$\hat{\underline{s}} = L^{-H} L^{-1} \left( \sum_{j=1}^{n} [A^j]^H \underline{x}^j \right).$$

Similarly, using the ZF block level estimator, the relation $$\left( \sum_{j=1}^{n} [A^j]^H [A^j] \right) = LL^H$$

is defined and then substituted into the corresponding ZF expression for $\hat{\underline{s}}$ to likewise obtain the relation:

$$\hat{\underline{s}} = L^{-H} L^{-1} \left( \sum_{j=1}^{n} [A^j]^H \underline{x}^j \right).$$

For both MMSE and ZF, the above expression for $\hat{\underline{s}}$ can be multiplied by $L^H$ to obtain a parameter $\underline{z}$ that is defined by the relation:

$$\underline{z} \equiv L^H \hat{\underline{s}} = L^{-1} \left( \sum_{j=1}^{n} [A^j]^H \underline{x}^j \right).$$

The solution for $\hat{\underline{s}}$ is a continuous valued function.

To obtain a discrete valued solution, an absolute difference value $\Delta$, defined as $$\Delta = \|L^H \hat{\underline{s}} - \underline{z}\|^2,$$

is minimized for all possible estimated values $\hat{\underline{s}}$ of the transmitted symbols $\underline{s}$, such as the phase shift keying (M-PSK) constellation points, to obtain the following expression:

$$\Delta = \left\| \begin{bmatrix} \delta_1 \\ \delta_2 \\ \vdots \\ \delta_N \end{bmatrix} \right\|^2 = \left\| \begin{bmatrix} l_{11} & l_{12} & \cdots & l_{1N} \\ 0 & l_{22} & \cdots & l_{2N} \\ \vdots & \vdots & \ddots & \vdots \\ 0 & 0 & \cdots & l_{NN} \end{bmatrix} \begin{bmatrix} \hat{s}_1 \\ \hat{s}_2 \\ \vdots \\ \hat{s}_N \end{bmatrix} - \begin{bmatrix} z_1 \\ z_2 \\ \vdots \\ z_N \end{bmatrix} \right\|^2.$$

To reduce the estimation error and increase the speed of the estimation, the discrete value minimization is applied to respective blocks of data symbols, rather than to the data symbols individually, so that an entire block of data symbols can be estimated at a time. The above expansion can therefore be rewritten to obtain the following cost function:

$$\Delta = \left\| \begin{bmatrix} \Delta_1 \\ \Delta_2 \\ \vdots \\ \Delta_Q \end{bmatrix} \right\|^2 = \left\| \begin{bmatrix} L_{11} & L_{12} & \cdots & L_{1Q} \\ 0 & L_{22} & \cdots & L_{2Q} \\ \vdots & \vdots & \ddots & \vdots \\ 0 & 0 & \cdots & L_{QQ} \end{bmatrix} \begin{bmatrix} \hat{s}_1 \\ \hat{s}_2 \\ \vdots \\ \hat{s}_Q \end{bmatrix} - \begin{bmatrix} z_1 \\ z_2 \\ \vdots \\ z_Q \end{bmatrix} \right\|^2,$$

where $$\Delta_i = \begin{bmatrix} \delta_1 \\ \vdots \\ \delta_{(W-1)i} \end{bmatrix} \in C^{W \times 1},$$

$$L_{ij} = \begin{bmatrix} l_{W(i-1),W(j-1)} & \cdots & l_{W(i-1),(W-1)j} \\ \vdots & \vdots & \vdots \\ l_{(W-1)i,W(j-1)} & \cdots & l_{(W-1)i,(W-1)j} \end{bmatrix} \in C^{W \times W},$$

$$\hat{s}_i = \begin{bmatrix} \hat{s}_{W(i-1)} \\ \vdots \\ \hat{s}_{(W-1)i} \end{bmatrix} \in C^{W \times 1} \text{ and}$$

$$z_i = \begin{bmatrix} z_{W(i-1)} \\ \vdots \\ z_{W(i-1)i} \end{bmatrix} \in C^{W \times 1}.$$

The value W is the size of the block of data symbols, namely the number of data symbols in a block, and the value Q is the number of blocks in the N transmitted data symbols, namely Q= N/W.

By substituting the above relations, the cost function can be rearranged into the following form:

$$\underbrace{\|L^H \hat{s} - z\|^2}_{=\Delta} = \underbrace{\|L_{QQ} \hat{s}_Q - z_Q\|^2}_{=\Delta_Q} + \underbrace{\|L_{Q-1,Q-1} \hat{s}_{Q-1} + L_{Q-1,Q} \hat{s}_Q - z_{Q-1}\|^2}_{=\Delta_{Q-1}} + \ldots + \underbrace{\left\| \sum_{j=1}^{Q} L_{ij} \hat{s}_j - z_i \right\|^2}_{=\Delta_i} + \ldots + \underbrace{\left\| \sum_{j=1}^{Q} L_{1j} \hat{s}_j - z_1 \right\|^2}_{=\Delta_1}$$

Then, the parameter $\Delta$ is minimized using the following iterative algorithm:

(1) For the first error term $\Delta_Q$ in the cost function, possible values for the estimated symbols $\hat{s}_Q$ are tested until a W sized sequence of symbols that minimizes the first error term $\Delta_Q(\hat{s}_Q)$ is obtained. This operation is referred to as sequence estimation.

(2) Using the symbols $\hat{s}_Q$ estimated in the previous step, possible values of $\hat{s}_{Q-1}$ are tested until a W sized sequence of symbols is obtained that minimizes the error term $\Delta_{Q-1}(\hat{s}_{Q-1}, \hat{s}_Q)$. This operation is known as decision-feedback.

(3) The above decision-feedback operation is repeated to minimize the error term $\Delta_{Q-2}$. Namely, using the symbols $\hat{s}_Q$ and $\hat{s}_{Q-1}$ estimated in the previous step, possible values of $\hat{s}_{Q-2}$ tested to obtain a W sized sequence of symbols that minimizes the error term $\Delta_{Q-2}(\hat{s}_{Q-2}, \hat{s}_{Q-1}, \hat{s}_Q)$.

(4) The above decision-feedback operation is repeated for each error term until the final error term $\Delta_1$ is estimated, i.e, until, using the symbols $\hat{s}_2, \ldots, \hat{s}_Q$ estimated in the previous steps, possible values of $\hat{s}_1$ are tested until a W sized sequence of symbols is obtained that minimizes the error term $\Delta_1(\hat{s}_1, \ldots, \hat{s}_Q)$.

The number of possible symbol states that are tested for each block is $M^W$. Thus, the size of W should be restricted to values that attain an acceptable detection performance while the complexity of processing the test values is kept within the capability of the digital signal processor or other processor that carries out the above iterative process. As an example, for eight phase state phase shift keying (8-PSK) modulation, W preferably has the value 3 or 4.

Figure 3:
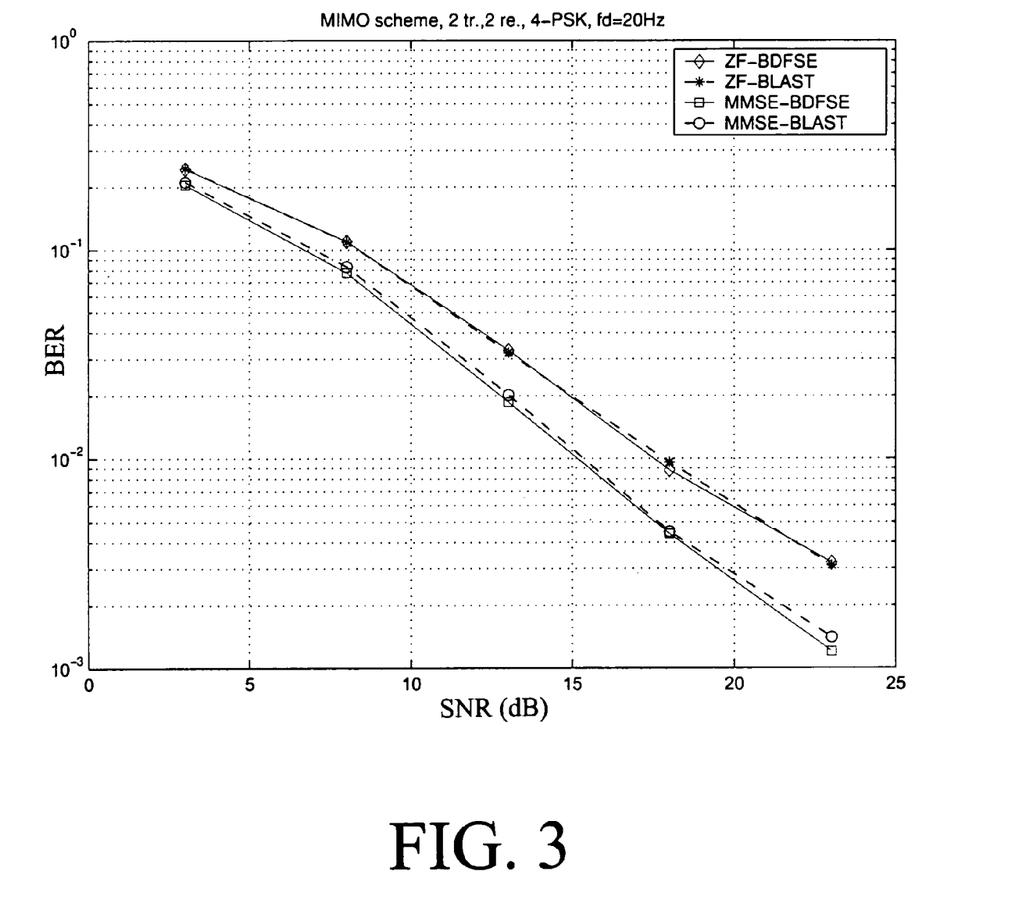
FIG. 3 is a diagram showing respective measured bit error rates as a function of signal-to-noise ratio for a (2, 2) MTMR communications system using 4-PSK modulation with 20 Hz fading for MMSE block decision feedback sequence estimation and for ZF block decision feedback sequence estimation in accordance with the invention and for known MMSE and ZF BLAST estimations.

FIG. 3 shows a measured bit error rate (BER) as a function of the signal-to-noise ratio (SNR) for a two transmit antenna, two receive antenna, known as (2, 2), MTMR communication system using 4-PSK modulation with 20 Hz fading. Five thousand independent time slots are averaged for each BER calculation using twenty five training symbols for each antenna used for channel estimation. The lower solid curve (identified as MMSE-BDFSE) represents a MMSE block decision feedback sequence estimation of the invention, and the upper solid curve (ZF-BDFSE) represents a ZF block decision feedback sequence estimation of the invention. The lower dashed curve (MMSE-BLAST) and the upper dashed curve (ZF-BLAST) represent MMSE BLAST and ZF BLAST estimations, respectively. The MMSE block decision feedback estimation of the invention attains a lower BER for a given SNR than the MMSE BLAST estimation, and the ZF block decision feedback estimation of the invention attains a lower BER for a given SNR than the ZF BLAST estimation.

Figure 4:
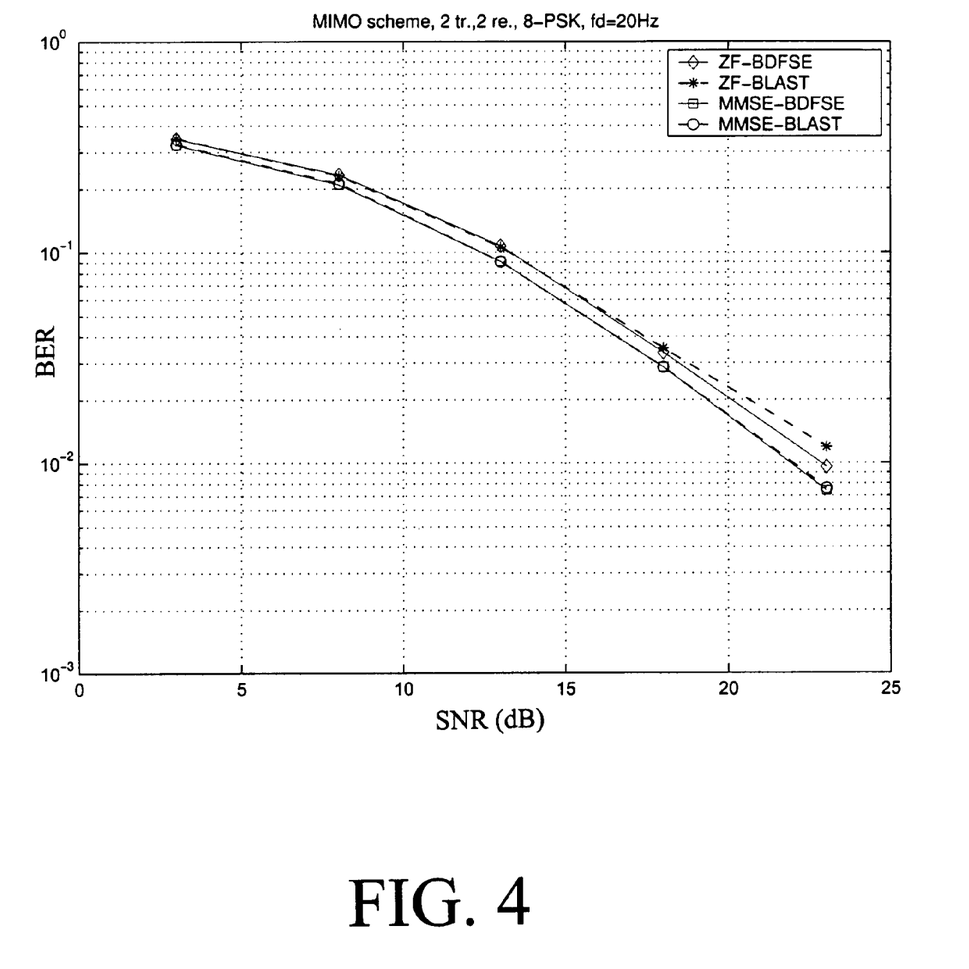
FIG. 4 is a diagram showing respective measured bit error rates as a function of signal-to-noise ratio for a (2, 2) MTMR communications system using 8-PSK modulation with 20 Hz fading for MMSE block decision feedback sequence estimation and for ZF block decision feedback sequence estimation in accordance with the invention and for known MMSE and ZF BLAST estimations.

FIG. 4 illustrates the measured BER as a function of the SNR for a (2, 2) MTMR communication system using 4-PSK modulation with 20 Hz fading. Five thousand independent time slots are averaged for each BER calculation using twenty five training symbols for each antenna used for channel estimation. The lower solid curve (MMSE-BDFSE) represents a MMSE block decision feedback sequence estimation of the invention, and the upper solid curve (ZF-BDFSE) represents a ZF block decision feedback sequence estimation of the invention. The lower dashed curve (MMSE-BLAST) and the upper dashed curve (ZF-BLAST) represent MMSE BLAST and ZF BLAST estimations, respectively. The MMSE block decision feedback estimation of the invention attains a lower BER for a given SNR than the MMSE BLAST estimation, and the ZF block decision feedback estimation of the invention attains a lower BER for a given SNR than the ZF BLAST estimation.

In contrast to existing techniques, such as the BLAST algorithm, the receiver scheme of the invention allows for the estimation of the transmitted symbols in the presence of inter-symbol interference (ISI). Thus, the above process may also be applied to other communication systems, such as those incorporating Turbo processing and orthogonal frequency division multiplexing (OFDM).

In OFDM based wireless systems, for example, the same subcarriers are used in different transmit antennas. The invention may be used to demodulate the transmitted signal. The invention may also be applied to multi-user detection or multi-code detection in third generation, universal mobile telecommunication system (UMTS) base transceiver station (BTS) products.

Although the present invention has been described in relation to particular embodiments thereof, many other variations and modifications and other uses may become apparent to those skilled in the art. It is preferred, therefore, that the present invention be limited not by this specific disclosure herein, but only by the appended claims.

What is claimed is:

1. A method of estimating transmitted data symbols from a plurality of signal samples received by a plurality of receivers, said data symbols being part of included in a data stream that is divided into a plurality of substreams, each of said received signal samples including at least one data symbol from each of said plurality of substreams, said method comprising:
   (a) representing said plurality of signal samples as a function of a plurality of transmitted data symbols and a plurality of channel response values, each of said plurality of channel response values representing a respective signal response for a transmission path of at least one of said plurality of transmitted data symbols, at least a portion of said plurality of channel response values including channel responses caused by multipath scattering;
   (b) defining a plurality of estimated data symbols as a function of said plurality of signal samples, said function satisfying a performance related criterion;
   (c) determining a difference expression that represents a difference between a function of said plurality of estimated data symbols and a function of said plurality of signal samples, said difference expression being a sum of a plurality of terms;
   (d) selecting values for each of a portion of said plurality of estimated data symbols such that one of said plurality of terms is minimized;
   (e) selecting values for a further portion of said plurality of estimated data symbols such that a further one of said plurality of terms is minimized, said further one of said plurality of terms being a function of said further portion of said plurality of estimated data symbols and said selected values of said plurality of estimated data symbols; and
   (f) repeating step (e) until each of said plurality of terms is minimized.

2. The method of claim 1 wherein each of said plurality of substreams is respectively transmitted by a respective one of a plurality of transmitters, and each of said received signal samples includes at least one data symbol from each of said plurality of transmitters.

3. The method of claim 1 wherein each of said plurality of substreams represents a respective one of a plurality of users, and each of said received signal samples includes at least one data symbol from each of said plurality of users.

4. The method of claim 1 wherein said function of said plurality of transmitted data symbols and said plurality of channel response values is defined by the following relation:

$$\underline{x}^j = A^j \underline{s} + \underline{n}^j \in C^{N \times 1},$$

wherein $\underline{x}^j$ is a vector representing N stacked signal samples received at a receiver antenna j, $A^j$ is a matrix representing said plurality of channel response values, $\underline{s}$ is a vector representing said transmitted data symbols, $\underline{n}^j$ is a vector representing additive white Gaussian noise that is received by said receiver antenna j while each of said N stacked signal samples is being received.

5. The method of claim 1 wherein said performance related criterion is a minimum mean squared error (MMSE) and said function of said plurality of signal samples is defined by the following relation:

$$\hat{\underline{s}} = \left( \sum_{j=1}^{n} [A^j]^H [A^j] + \sigma^2 R_{ss}^{-1} \right)^{-1} \left( \sum_{j=1}^{n} [A^j]^H \underline{x}^j \right),$$

wherein $\hat{\underline{s}}$ represents said plurality of estimated data symbols, $A^j$ is a matrix representing said plurality of channel response values, $\underline{x}^j$ is a vector representing N stacked signal samples received at each of said plurality of receivers, $\underline{s} \sim N(\underline{0}, R_{ss})$, and $R_{ss} = \epsilon\{\hat{\underline{s}}\hat{\underline{s}}^H\} = I$.

6. The method of claim 1 wherein said performance related criterion is zero forcing (ZF) and said function of said plurality of signal samples is defined by the following relation:

$$\hat{\underline{s}} = \left( \sum_{j=1}^{n} [A^j]^H [A^j] + \sigma^2 R_{ss}^{-1} \right)^{-1} \left( \sum_{j=1}^{n} [A^j]^H \underline{x}^j \right),$$

wherein $\hat{\underline{s}}$ represents said plurality of estimated data symbols, $A^j$ is a matrix representing said plurality of channel response values, $\underline{x}^j$ is a vector representing N stacked signal samples received at each of said plurality of receivers, $\underline{s} \sim N(\underline{0}, R_{ss})$, and $R_{ss} = \epsilon\{\underline{s}\underline{s}^H\} = I$.

7. The method of claim 1 wherein said difference expression is defined by the following relation:

$$\underbrace{\|L^H \hat{\underline{s}} - \underline{z}\|^2}_{=\underline{\Delta}} = \underbrace{\|L_{QQ}\hat{\underline{s}}_Q - \underline{z}_Q\|^2}_{=\underline{\Delta}_Q} + \underbrace{\|L_{Q-1,Q-1}\hat{\underline{s}}_{Q-1} + L_{Q-1,Q}\hat{\underline{s}}_Q - \underline{z}_{Q-1}\|^2}_{=\underline{\Delta}_{Q-1}} +$$

$$\ldots + \underbrace{\left\|\sum_{j=1}^{Q} L_{ij}\hat{\underline{s}}_j - \underline{z}_i\right\|^2}_{=\underline{\Delta}_i} + \ldots + \underbrace{\left\|\sum_{j=1}^{Q} L_{1j}\hat{\underline{s}}_j - \underline{z}_1\right\|^2}_{=\underline{\Delta}_i},$$

wherein $$L_{ij} = \begin{bmatrix} l_{W(i-1),W(j-1)} & \cdots & l_{W(i-1),(W-1)j} \\ \vdots & \vdots & \vdots \\ l_{(W-1)i,W(j-1)} & \cdots & l_{(W-1)i,(W-1)j} \end{bmatrix} \in C^{W \times W},$$

-continued $$\hat{\underline{s}}_i = \begin{bmatrix} \hat{s}_{W(i-1)} \\ \vdots \\ \hat{s}_{(W-1)i} \end{bmatrix} \in C^{W \times 1},$$

$\hat{\underline{s}}_j$ represents a block of said plurality of estimated data symbols, $$\underline{z}_i = \begin{bmatrix} z_{W(i-1)} \\ \vdots \\ z_{W(i-1)i} \end{bmatrix} \in C^{W \times 1},$$

$z_j$ represents said function of said plurality of signal samples, W is a size of a block, Q is a number of blocks in N transmitted data symbols such that Q=N/W.

8. The method of claim 7 wherein said performance related criterion is a minimum mean squared error (MMSE) and L is defined by the following relation:

$$\left( \sum_{j=1}^{n} [A^j]^H [A^j] + \sigma^2 R_{ss}^{-1} \right) = LL^H$$

wherein $A^j$ is a matrix representing said plurality of channel response values, and $R_{ss} = \epsilon\{\underline{ss}^H\} = I$.

9. The method of claim 7 wherein said performance related criterion is zero forcing (ZF) and L is defined by the following relation:

$$\left( \sum_{j=1}^{n} [A^j]^H [A^j] \right) = LL^H$$

wherein $A^j$ is a matrix representing said plurality of channel response values.

10. The method of claim 7 wherein said one of said plurality of terms is $\Delta_Q$, and said further one of said plurality of terms is, successively, $\Delta_{Q-1}, \Delta_{Q-2}, \ldots, \Delta_i, \ldots, \Delta_1$.

11. An apparatus for estimating transmitted data symbols from a plurality of signal samples received by a plurality of receivers, said data symbols being part of a data stream that is divided into a plurality of substreams, each of said received signal samples including at least one data symbol from each of said plurality of substreams, said apparatus being configured to:
(a) represent said plurality of signal samples as a function of a plurality of transmitted data symbols and a plurality of channel response values, each of said plurality of channel response values representing a respective signal response for a transmission of at least one of said plurality of transmitted data symbols, at least a portion of said plurality of channel response values including channel responses caused by multipath scattering;
(b) define a plurality of estimated data symbols as a function of said plurality of signal samples, said function satisfying a performance related criterion;
(c) determine a difference expression that represents a difference between a function of said plurality of estimated data symbols and a function of said plurality of signal samples, said difference expression being a sum of a plurality of terms;
(d) select values for each of a portion of said plurality of estimated data symbols such that one of said plurality of terms is minimized;
(e) select values for a further portion of said plurality of estimated data symbols such that a further one of said plurality of terms is minimized, said further one of said plurality of terms being a function of said further portion of said plurality of estimated data symbols and said selected values of said plurality of estimated data symbols; and
(f) repeat element (e) until each of said plurality of terms is minimized.

12. The apparatus of claim 11 wherein each of said plurality of substreams is respectively transmitted by a respective one of a plurality of transmitters, and each of said received signal samples includes at least one data symbol from each of said plurality of transmitters.

13. The apparatus of claim 11 wherein each of said plurality of substreams represents a respective one of a plurality of users, and each of said received signal samples includes at least one data symbol from each of said plurality of users.

14. The apparatus of claim 11 wherein said function of said plurality of transmitted data symbols and said plurality of channel response values is defined by the following relation:

$$\underline{x}^j = A^j \underline{s} + \underline{n}^j = \epsilon C^{N \times 1},$$

wherein $\underline{x}^j$ is a vector representing N stacked signal samples received at a receiver antenna j, $A^j$ is a matrix representing said plurality of channel response values, $\underline{s}$ is a vector representing said transmitted data symbols, $\underline{n}^j$ is a vector representing additive white Gaussian noise that is detected by said receiver antenna j while each of said N stacked signal samples is being detected.

15. The apparatus of claim 11 wherein said performance related criterion is a minimum mean squared error (MMSE) and said function of said plurality of signal samples is defined by the following relation:

$$\hat{\underline{s}} = \left( \sum_{j=1}^{n} [A^j]^H [A^j] + \sigma^2 R_{ss}^{-1} \right)^{-1} \left( \sum_{j=1}^{n} [A^j]^H \underline{x}^j \right),$$

wherein $\hat{\underline{s}}$ represents said plurality of estimated data symbols, $A^j$ is a matrix representing said plurality of channel response values, $\underline{x}^j$ is a vector representing N stacked signal samples received at each of said plurality of receivers, $\underline{s} \sim N(\underline{0}, R_{ss})$, and $R_{ss} = \epsilon\{\underline{ss}^H\} = I$.

16. The apparatus of claim 11 wherein said performance related criterion is zero forcing (ZF) and said function of said plurality of signal samples is defined by the following relation:

$$\hat{\underline{s}} = \left( \sum_{j=1}^{n} [A^j]^H [A^j] \right)^{-1} \left( \sum_{j=1}^{n} [A^j]^H \underline{x}^j \right),$$

wherein $\hat{\underline{s}}$ represents said plurality of estimated data symbols, $A^j$ is a matrix representing said plurality of channel response values, $\hat{x}^j$ is a vector representing N stacked signal samples received at each of said plurality of receivers, $\underline{s} \sim N(\underline{0}, R_{ss})$, and $R_{ss} = \epsilon\{\underline{ss}^H\} = I$.

17. The apparatus of claim 11 wherein said difference expression is defined by the following relation:

$$\underbrace{\|L^H \hat{\underline{s}} - \underline{z}\|^2}_{=\Delta} = \underbrace{\|L_{QQ}\hat{\underline{s}}_Q - \underline{z}_Q\|^2}_{=\Delta_Q} + \underbrace{\|L_{Q-1,Q-1}\hat{\underline{s}}_{Q-1} + L_{Q-1,Q}\hat{\underline{s}}_Q - \underline{z}_{Q-1}\|^2}_{=\Delta_{Q-1}} + \ldots + \underbrace{\left\|\sum_{j=i}^{Q} L_{ij}\hat{\underline{s}}_j - \underline{z}_i\right\|^2}_{=\Delta_i} + \ldots + \underbrace{\left\|\sum_{j\neq 1}^{Q} L_{1j}\hat{\underline{s}}_j - \underline{z}_1\right\|^2}_{=\Delta_1},$$

wherein $$L_{ij} = \begin{bmatrix} l_{W(i-1),W(j-1)} & \cdots & l_{W(i-1),(W-1)j} \\ \vdots & \vdots & \vdots \\ l_{(W-1)i,W(j-1)} & \cdots & l_{(W-1)i,(W-1)j} \end{bmatrix} \in C^{W \times W}.$$

$$\hat{\underline{s}}_i = \begin{bmatrix} \hat{s}_{W(i-1)} \\ \vdots \\ \hat{s}_{(W-1)i} \end{bmatrix} \in C^{W \times 1},$$

$\hat{\underline{s}}_j$ represents a block of said plurality of estimated data symbols, $$\underline{z}_i = \begin{bmatrix} z_{W(i-1)} \\ \vdots \\ z_{W(i-1)i} \end{bmatrix} \in C^{W \times 1},$$

$z_j$ represents said function of said plurality of signal samples, W is a size of a block, Q is a number of blocks in N transmitted data symbols such that Q=N/W.

18. The apparatus of claim 17 wherein said performance related criterion is a minimum mean squared error (MMSE) and L is defined by the following relation:

$$\left(\sum_{j=1}^{n} [A^j]^H [A^j] + \sigma^2 R_{ss}^{-1}\right) = LL^H$$

wherein $A^j$ is a matrix representing said plurality of channel response values, and $R_{ss} = \epsilon\{\underline{ss}^H\} = I$.

19. The apparatus of claim 17 wherein said performance related criterion is zero forcing (ZF) and L is defined by the following relation:

$$\left(\sum_{j=1}^{n} [A^j]^H [A^j]\right) = LL^H$$

wherein $A^j$ is a matrix representing said plurality of channel response values.

20. The apparatus of claim 17 wherein said one of said plurality of terms is $\Delta_Q$, and said further one of said plurality of terms is, successively, $\Delta_{Q-1}, \Delta_{Q-2}, \ldots, \Delta_i, \ldots, \Delta_1$.

21. A computer readable medium comprising:
instructions for estimating transmitted data symbols from a plurality of signal samples received by a plurality of receivers, said data symbols being part of included in a data stream that is divided into a plurality of substreams, each of said received signal samples including at least one data symbol from each of said plurality of substreams, said instructions comprising:

(a) instructions for representing said plurality of signal samples as a function of a plurality of transmitted data symbols and a plurality of channel response values, each of said plurality of channel response values representing a respective signal response for a transmission path of at least one of said plurality of transmitted data symbols, at least a portion of said plurality of channel response values including channel responses caused by multipath scattering;

(b) instructions for defining a plurality of estimated data symbols as a function of said plurality of signal samples, said function satisfying a performance related criterion;

(c) instructions for determining a difference expression that represents a difference between a function of said plurality of estimated data symbols and a function of said plurality of signal samples, said difference expression being a sum of a plurality of terms;

(d) instructions for selecting values for each of a portion of said plurality of estimated data symbols such that one of said plurality of terms is minimized;

(e) instructions for selecting values for a further portion of said plurality of estimated data symbols such that a further one of said plurality of terms is minimized, said further one of said plurality of terms being a function of said further portion of said plurality of estimated data symbols and said selected values of said plurality of estimated data symbols; and (f) instructions for repeating instruction (e) until each of said plurality of terms is minimized.

22. The medium of claim 21 wherein each of said plurality of substreams is respectively transmitted by a respective one of said a plurality of transmitters, and each of said received signal samples includes at least one data symbol from each of said plurality of transmitters.

23. The medium of claim 21 wherein each of said plurality of substreams represents a respective one of a plurality of users, and each of said received signal samples includes at least one data symbol from each of said plurality of users.

24. The medium of claim 21 wherein said function of said plurality of transmitted data symbols and said plurality of channel response values is defined by the following relation:

$$\underline{x}^j = A^j \underline{s} + \underline{n}^j \in C^{H \times 1},$$

wherein $\underline{x}^j$ is a vector representing N stacked signal samples received at a receiver antenna j, $A^j$ is a matrix representing said plurality of channel response values, $\underline{s}$ is a vector representing said transmitted data symbols, $\underline{n}^j$ is a vector representing additive white Gaussian noise that is received by said receiver antenna j while each of said N stacked signal samples is being received.

25. The medium of claim 21 wherein said performance related criterion is a minimum mean squared error (MMSE) and said function of said plurality of signal samples is defined by the following relation:

$$\hat{s} = \left(\sum_{j=1}^{n} [A^j]^H [A^j] + \sigma^2 R_{ss}^{-1}\right)^{-1} \left(\sum_{j=1}^{n} [A^j]^H \underline{x}^j\right),$$

wherein $\hat{\underline{s}}$ represents said plurality of estimated data symbols, $A^j$ is a matrix representing said plurality of channel response values, $\underline{x}^j$ is a vector representing N stacked signal signal samples received at each of said plurality of receivers, $\underline{s} \sim N(\underline{0}, R_{ss})$, and $R_{ss} = \epsilon\{\underline{ss}^H\} = I$.

26. The medium of claim 21 wherein said performance related criterion is zero forcing (ZF) and said function of said plurality of signal samples is defined by the following relation:

$$\hat{\underline{s}} = \left(\sum_{j=1}^{n} [A^j]^H [A^j]\right)^{-1} \left(\sum_{j=1}^{n} [A^j]^H \underline{x}^j\right),$$

wherein $\hat{\underline{s}}$ represents said plurality of estimated data symbols, $A^j$ is a matrix representing said plurality of channel response values, $\underline{x}^j$ is a vector representing N stacked signal samples received at each of said plurality of receivers, $\underline{s} \sim N(\underline{0}, R_{ss})$, and $R_{ss} = \epsilon\{\underline{ss}^H\} = I$.

27. The medium of claim 21 wherein said difference expression is defined by the following relation:

$$\underbrace{\|L^H \hat{\underline{s}} - \underline{z}\|^2}_{=\Delta} = \underbrace{\|L_{QQ}\hat{s}_Q - z_Q\|^2}_{=\Delta_Q} + \underbrace{\|L_{Q-1,Q-1}\hat{s}_{Q-1} + L_{Q-1,Q}\hat{s}_Q - z_{Q-1}\|^2}_{=\Delta_{Q-1}} + \ldots + \underbrace{\left\|\sum_{j=i}^{Q} L_{ij}\hat{s}_j - z_i\right\|^2}_{=\Delta_i} + \ldots + \underbrace{\left\|\sum_{j\neq 1}^{Q} L_{1j}\hat{s}_j - z_1\right\|^2}_{=\Delta_1},$$

wherein $$L_{ij} = \begin{bmatrix} l_{W(i-1),W(j-1)} & \cdots & l_{W(i-1),(W-1)j} \\ \vdots & \vdots & \vdots \\ l_{(W-1)i,W(j-1)} & \cdots & l_{(W-1)i,(W-1)j} \end{bmatrix} \in C^{W \times W}.$$

$$\hat{s}_i = \begin{bmatrix} \hat{s}_{W(i-1)} \\ \vdots \\ \hat{s}_{(W-1)i} \end{bmatrix} \in C^{W \times 1},$$

$\hat{s}_j$ represents a block of said plurality of estimated data symbols, $$z_i = \begin{bmatrix} z_{W(i-1)} \\ \vdots \\ z_{W(i-1)i} \end{bmatrix} \in C^{W \times 1},$$

$z_j$ represents said function of said plurality of signal samples, W is a size of a block, Q is a number of blocks in N transmitted data symbols such that Q=N/W.

28. The medium of claim 27 wherein said performance related criterion is a minimum mean squared error (MMSE) and L is defined by the following relation:

$$\left(\sum_{j=1}^{n} [A^j]^H [A^j] + \sigma^2 R_{ss}^{-1}\right) = LL^H$$

wherein $A^j$ is a matrix representing said plurality of channel response values, and $R_{ss} = \epsilon\{\underline{ss}^H\} = I$.

29. The medium of claim 27 wherein said performance related criterion is zero forcing (ZF) and L is defined by the following relation:

$$\left(\sum_{j=1}^{n} [A^j]^H [A^j]\right) = LL^H$$

wherein $A^j$ is a matrix representing said plurality of channel response values.

30. The medium of claim 27 wherein said one of said plurality of terms is $\cdot\Delta_Q$, and said further one of said plurality of terms is, successively, $\cdot\Delta_{Q-1}, \cdot\Delta_{Q-2}, \ldots, \cdot\Delta_i, \ldots, \cdot\Delta_1$.

31. An apparatus for estimating transmitted data symbols from a plurality of signal samples received by a plurality of receivers, said data symbols being part of a data stream that is divided into a plurality of substreams, each of said received signal samples including at least one data symbol from each of said plurality of substreams, said apparatus comprising:

(a) means for representing said plurality of signal samples as a function of a plurality of transmitted data symbols and a plurality of channel response values, each of said plurality of channel response values representing a respective signal response for a transmission path of at least one of said plurality of transmitted data symbols, at least a portion of said plurality of channel response values including channel responses caused by multipath scattering;

(b) means for defining a plurality of estimated data symbols as a function of said plurality of signal samples, said function satisfying a performance related criterion;

(c) means for determining a difference expression that represents a difference between a function of said plurality of estimated data symbols and a function of said plurality of signal samples, said difference expression being a sum of a plurality of terms;

(d) means for selecting values for each of a portion of said plurality of estimated data symbols such that one of said plurality of terms is minimized;

(e) means for selecting values for a further portion of said plurality of estimated data symbols such that a further one of said plurality of terms is minimized, said further one of said plurality of terms being a function of said further portion of said plurality of estimated data symbols and said selected values of said plurality of estimated data symbols; and (f) means for repeating (e) until each of said plurality of terms is minimized.

* * * * *